United States Patent [19]

Dougherty et al.

[11] Patent Number: 5,316,868
[45] Date of Patent: May 31, 1994

[54] DUAL BATTERY SWITCH CIRCUIT

[75] Inventors: Thomas J. Dougherty, Waukesha; John R. Pierson, Brookfield, both of Wis.

[73] Assignee: Globe-Union, Inc., Milwaukee, Wis.

[21] Appl. No.: 917,581

[22] Filed: Jul. 21, 1992

[51] Int. Cl.⁵ .......................................... H01M 10/04
[52] U.S. Cl. ........................................ 429/9; 429/62
[58] Field of Search ..................................... 429/9, 62

[56] References Cited

U.S. PATENT DOCUMENTS

| | | | |
|---|---|---|---|
| 4,572,878 | 4/1962 | Daugherty | 429/62 |
| 5,002,840 | 3/1991 | Klebenow et al. | 429/9 |
| 5,079,716 | 1/1992 | Lenhardt et al. | 364/483 |
| 5,154,985 | 10/1992 | Tanaka | 429/9 |
| 5,162,164 | 11/1992 | Dougherty | 429/9 |
| 5,215,834 | 6/1993 | Reher et al. | 429/62 |

FOREIGN PATENT DOCUMENTS

| | | | |
|---|---|---|---|
| 2964671 | 2/1971 | Canada | 429/9 |
| 398691 | 11/1990 | European Pat. Off. | |
| 2173056A | 10/1986 | United Kingdom | 429/9 |

Primary Examiner—David B. Springer
Attorney, Agent, or Firm—Foley & Lardner

[57] ABSTRACT

A dual-battery switch circuit associated with a load is provided. The switch circuit includes a primary battery, a secondary battery, a circuit disposed to apply energy from the primary battery to the load, and a controller which disposed to sense attempts to apply energy to the load. The controller is configured to couple the secondary battery to the primary battery with respect to the load when a predetermined number of attempts to apply energy to the load occur within a predetermined time period after a first attempt. Alternatively, a controller is provided which couples the secondary battery to the primary battery with respect to the load when an attempt is made to apply energy to the load and the temperature is below a predetermined level.

10 Claims, 5 Drawing Sheets

DUAL BATTERY SWITCH CIRCUIT

FIELD OF THE INVENTION

The present invention generally relates to a dual battery power control system and, more particularly, to a switching device for selectively coupling dual batteries.

BACKGROUND OF THE INVENTION

A partially or totally drained automotive battery is often unable to supply enough power to start an automobile. Further, certain charged batteries may not be able to supply the necessary cranking power to start an automobile under adverse environmental conditions. For example, at very cold temperatures, the potential across a charged battery can drop drastically, thus lessening its overall power output. For example, in cold weather the voltage of a normal 6cell, 12 volt automotive battery will typically drop to 5 to 7 volts. This lower voltage may not be able to supply a starting motor with sufficient cranking power. As a result, the engine may turn over at a lower RPM, or not at all.

The problem caused by the high current demand of the starting motor has prompted efforts to augment the power of an automobile battery during starting. In one known approach, an auxiliary battery is used to supply extra power at starting, but is otherwise isolated during main battery drain. Such a system is shown in European Patent Publication No. 398,691 issued to Witehira, in which the auxiliary battery is coupled in parallel to the main battery in response to an indication that the vehicle is being started. A disadvantage of this approach is that the auxiliary battery switches-in at starting whether or not a power boost is needed.

To alleviate this problem, some systems provide a manual switch to actuate the coupling of the auxiliary battery to the main battery. Such an approach is shown in U.S. Pat. No. 5,002,840 issued to Klebenow, et al. Under this approach, an operator is able to switch-in the extra battery whenever he desires. However, this approach also has significant disadvantages. For example, the manual switch is often located in an inconvenient place, such as under the hood, to avoid excessive wiring. Further, an operator does not always know when extra power is needed.

A further disadvantage of many of the present switch-in systems is that an open circuit between the main battery and the load is created during the switch-in. While the circuit remains open fur a relatively brief time, the voltage drop caused thereby, followed by the voltage surge that occurs when the switch is complete, may cause considerable wear on the electrical components of the power system.

In view of the forgoing, it would be desirable to provide a power control system which is capable of augmenting the power of a primary automotive battery at starting when the primary automotive battery alone is unable to supply sufficient power to start the engine.

It would further be desirable to provide a power control system which has a circuit capable of sensing when the primary automotive battery is unable to supply sufficient cranking power, and when such is the case, to automatically "switch-in" an auxiliary battery.

SUMMARY OF THE INVENTION

A preferred embodiment of the dual-battery switch circuit of the present invention provides a switch circuit associated with a load. The switch circuit includes a primary battery, a secondary battery, a circuit disposed to apply energy from the primary battery to the load, and a controller which disposed to sense attempts to apply energy to the load.

The controller is configured to couple the secondary battery to the primary battery with respect to the load when a predetermined number of attempts to apply energy to the load occur within a predetermined time period after a first attempt.

In accordance with another aspect of the invention, the present invention provides a switch circuit associated with a load. The switch circuit generally includes a primary battery, a secondary battery, and a circuit disposed to apply energy from the primary battery to the load. The switch circuit further comprises a controller disposed to sense temperature. The controller is further disposed to sense attempts to apply energy to the load. The controller couples the secondary battery to the primary battery with respect to the load when an attempt is made to apply energy to the load and the temperature is below a predetermined level.

DESCRIPTION OF THE DRAWINGS

The preferred exemplary embodiment of the present invention will hereinafter be described in conjunction with the appended drawing, wherein like numerals denote like elements, and.

DETAILED DESCRIPTION OF THE PREFERRED EMBODIMENT

Figure 1:
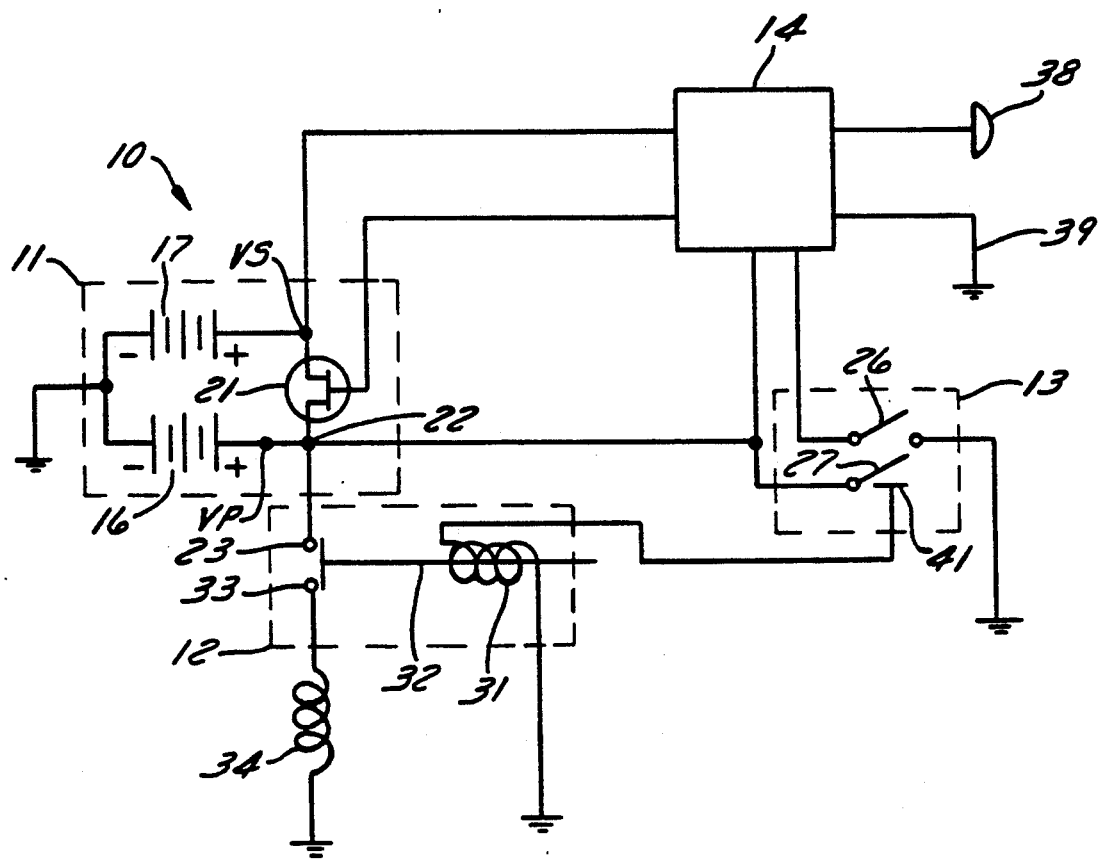
FIG. 1 is a schematic diagram of an exemplary embodiment of a dual-battery switch circuit in accordance with the present invention.

Referring to FIG. 1, a remotely-actuated switched dual battery system 10 according to one embodiment of the invention for automotive SLI applications includes as main components a dual battery 11 having a primary battery 16 and a secondary battery 17, a starter solenoid 12, an ignition switch 13 and a controller 14, all electrically connected as shown. These components cooperate to draw power from secondary battery 17 only under predetermined conditions, as described in detail hereafter.

Dual battery 11 may comprise the dual lead acid battery disclosed in U.S. Pat No. 5,002,840, the entire contents of which are incorporated herein by reference, or may comprise two separate batteries of the same or different voltages and types. For some automotive applications, it may be advantageous to use 12 and 24 or 48 volt batteries, the latter being provided with a converter to convert the 24 or 48 volt battery current to 12 V when needed. The higher voltage battery can be used to power devices in the car such as seat position adjustment motors which require a higher voltage current.

The manual switch shown in the drawing of U.S. Pat. No. 5,002,840 which connects the positive terminations of primary and secondary batteries 16, 17 is replaced by a switch 21 which is remotely actuated electrically. Switch 21 is preferably a metal oxide semiconductor field effect transistor (MOSFET), but could also be a magnetic-latching relay or a dual function (2-coil) solenoid provided with a reset circuit. Switch 21 and controller 14, the circuitry for which is described in detail below, may be combined in a single modular unit which plugs into dual battery 11 through a cavity in the top of the battery cover as shown in U.S. Pat. No. 5,002,840. Switch 21 and controller 14 can be unplugged when dual battery 11 needs replacement, and then reconnected to the replacement battery, eliminating the need to build the switching mechanism into each new battery. Controller 14 could also be a microprocessor or be part of an on-board computer system that controls a variety of vehicle functions.

A positive external terminal 22 of dual battery 11 is connected by wires or the like to a contact 23 of starter solenoid 12 and to a switch 27 of ignition switch 13. Switch 13 also includes a second switch 26 Which operates simultaneously (in tandom) with switch 27, where switches 26 and 27 are normally open.

Respective positive terminations of primary battery 16 and secondary battery 17 are connected in parallel to a common positive terminal 22. Negative terminations of primary battery 16 and secondary battery 27 are similarly connected to a common ground. The electrically-actuable switch 21 is interposed between the positive terminations so that power can be drawn from secondary battery 17 from the battery terminals only when switch 21 is closed. As described in U.S. Pat. No. 5,002,840, secondary battery 17 is provided with a bypass circuit (not shown) preferably including a variable resistance diode so that secondary battery 17 recharges by means of the vehicle alternator when the vehicle is in operation.

When the ignition key is turned to starting position, contact arm 27 engages a contact 41 to provide power to a coil 31 of starter solenoid 12, and contact arm 26 is grounded. The engagement of arm 27 to contact 41 actuates a plunger 32 which connects contact 23 with a corresponding contact 33, connecting battery 11 with a load 34, such as a starter motor to start the vehicle.

Controller 14 draws small amounts of power directly from secondary battery 17, so that controller 14 continues to operate even if primary battery 16 is completely drained. Controller 14 is connected to contact arm 26 and applies a constant nominal potential thereto. As described in detail below, closure of switch 26 by turning the ignition key to the starting position indicates to controller 14 that an attempt is being made to start the car. According to a preferred aspect of the invention, and contrary to the teaching of the foregoing European Patent Publication No. 398,691, controller 14 does not connect the secondary battery 17 to start the car each time the car is started. Instead, controller 14 actuates switch 21 only under certain circumstances. For example, (1) if ignition is attempted N times (e.g. 2 times) within a predetermined time period, such as at least two minutes, after the first attempt indicating that the first ignition attempt failed, or (2) if the temperature is below a predetermined level so that the battery will need extra starting power.

For the latter purpose, controller 14 may include a suitable temperature sensing arrangement for measuring temperature, preferably in close proximity to the battery, such as a temperature sensitive diode, thermocouple, a transistor built into controller 14, or a battery temperature estimating circuit. Controller 14 applies a potential to the diode and monitors the resulting current, which changes as a function of temperature. If the temperature is below a predetermined level, preferably in the range of -5 to 10°F., controller 14 actuates switch 21 automatically on the first ignition.

In this manner, starting power is drawn from the reserve or secondary battery only when it is needed, prolonging the life of the secondary battery. In one embodiment, switch 26 and the related logic in controller 14 may be omitted if only a temperature-responsive system is desired, or the temperature sensor and related logic and circuitry may be omitted if it is sufficient to rely on double-keying to activate the secondary battery.

Controller 14 is also connected to primary battery 16, to a dashboard indicator such as an LED or lamp 38, and to a ground 39. When the vehicle has started with assistance from secondary battery 17, controller 14 continues to monitor the voltage across primary battery 16, and switch 21 remains active, until either (1) a predetermined timeout period has elapsed, or (2) the voltage of the primary battery rises to a predetermined level (e.g. 12.8 volts), indicating that no failure of the primary battery has occurred. The timeout period should be at least about 2 minutes to permit the voltage of primary battery 16 to recover after the vehicle has started. If the voltage across primary battery 16 rises above the predetermined level within the timeout period, switch 21 is deactivated. If recovery has not occurred by the end of the timeout period, controller 14 will cause warning lamp 38 to start flashing, and switch 21 will remain active.

Figure 2:
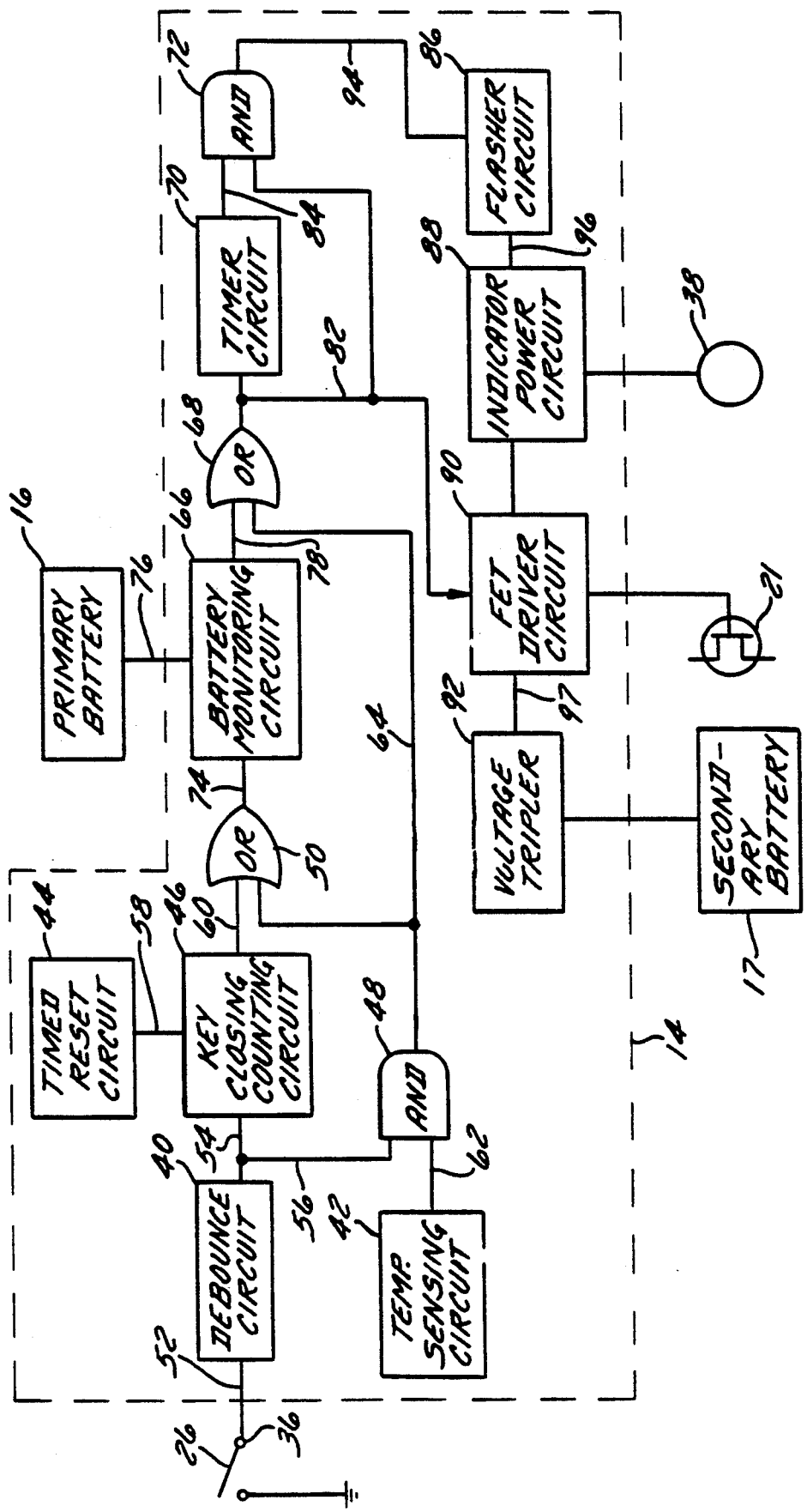
FIG. 2 is a block diagram of the controller used in the preferred embodiment of the present invention.

Referring to FIG. 2, controller 14 includes a debounce circuit 40, a temperature sensing circuit 42, a timed reset circuit 44, a key closing counting circuit 46, an AND gate 48, and an OR gate 50. Debounce circuit 40 is coupled to contact arm 26 by a conductor 52, to circuit 46 by a data line 54, and to AND gate 48 by a data line 56. When contact arm 26 is coupled to ground (key closing), a voltage drop is sensed by debounce circuit 40, and circuit 40 applies a pulse to circuit 46 and AND gate 48.

Key closing counting circuit 46 is coupled to timed reset circuit 44 by a data line 58, and to one input of OR gate 50 by a data line 60. Circuit 46 counts the pulses from circuit 40 and applies a logic HIGH signal to OR gate 50 when a predetermined number (N) of pulses corresponding to key closings have occurred. By way of example, the preferred embodiment of circuit 46 outputs a logic HIGH signal to OR gate 50 upon the occurrence of two key closings. Each time a key closing occurs, the timer of timed reset circuit 44 is started or restarted. Circuit 44 operates to reset itself and reset circuit 46 upon the expiration of a predetermined time. By way of example, the length of the predetermined time may be 2 minutes. Accordingly, if two key closings have been monitored by circuit 46 and the predetermined amount of time expires, the signal applied to OR gate 50 will be returned to a LOW logic level.

Temperature sensing circuit 42 is coupled to AND gate 48 by a data line 62, and AND gate 48 is coupled to OR gate 50 by a data line 64. Circuit 42 is configured to output a logic HIGH signal to AND gate 48 when the temperature at circuit 42 goes below a predetermined temperature, such as 5°F. Accordingly, when a key closing occurs, and circuit 40 senses a temperature below the predetermined limit, AND gate 48 applies a logic HIGH signal to OR gate 50. Thus, if N key closings have occurred within the predetermined time, or the temperature at circuit 42 is less than the predetermined limit, OR gate 50 will output a logic HIGH signal. By way of example, circuit 42 generally monitors the temperature of controller 14 since the temperature sensing arrangement of circuit 42 is mounted upon the circuit board for controller 14. However, depending upon the application, circuit 42 may be positioned at a location different than that of controller 14 for purposes of sensing the temperature of, or temperature related to, primary battery 16 and/or secondary battery 17. Additionally, the signal from circuit 42 may be replaced by a signal produced by a system for estimating battery temperature such as that disclosed in commonly-assigned U.S. patent application Ser. No. 07/517,622, filed May 1, 1990, which issued as U.S. Pat. No. 5,079,716 on Jan. 7, 1992.

Controller 14 also includes a battery monitoring circuit 66, an OR gate 68, a timer circuit 70, and an AND gate 72. Battery monitoring circuit 66 is coupled to OR gate 50 by a data line 74, to primary battery 16 by conductors 76, and to one input of OR gate 68 by a data line 78. Battery monitoring circuit 66 monitors primary battery 16 and applies a logic HIGH output signal to OR gate 68 when the voltage at primary battery 16 is below a predetermined level, such as 9.5V, and the signal on data line 74 is at logic HIGH. Accordingly, when two key closings have occurred within 2 minutes, or the temperature of circuit 42 is below 5°F., and the voltage of primary battery 16 is below 9.5V, circuit 66 applies a logic HIGH signal to OR gate 68.

Battery monitoring circuit 66 is configured to monitor primary battery 16 such that it operates with a hysteresis effect. More specifically, when the voltage at battery 16 drops below 9.5V and the logic at data line 74 is HIGH, circuit 66 will output a logic HIGH signal. When the voltage of battery 16 returns to above 9.5V and a logic HIGH voltage is at data line 74, circuit 66 will continue to output a logic HIGH voltage until the voltage monitored at battery 16 rises above a predetermined level, such as 12.8V. Thus, if the voltage at primary battery 16 does not rise above the predetermined level because, for example, primary battery 16 is not charging properly, the output of circuit 66 will remain a logic HIGH voltage.

A second input of OR gate 68 is coupled to the output of AND gate 48 by data line 64, and the output of OR gate 68 is coupled to timer circuit 70 and a first input of AND gate 72 by data line 82. A second input of AND gate 72 is coupled to the output of circuit 70 by a data line 84. Timer circuit 70 is configured to apply a logic HIGH signal to AND gate 72 if the logic level on data line 82 remains HIGH for a predetermined time, such as 2 minutes. More specifically, when a logic HIGH signal is applied to either input of OR gate 68, the timer of circuit 70 will be started and apply a logic HIGH signal to AND gate 72, after the expiration of 2 minutes. Accordingly, if the output of OR gate 68 remains high for 2 minutes a logic HIGH signal is applied to AND gate 72.

Controller 14 further includes a flasher circuit 86, an indicator power circuit 88, an FET driver circuit 90, and a voltage tripling circuit 92. The input of flasher circuit 86 is coupled to AND gate 72 by a data line 94, and the output of flasher circuit 86 is coupled to indicator power circuit 88 via a conductor 96. The input of FET driver circuit 90 is coupled to the output of OR gate 68 by data line 82, and circuit 88 is coupled to circuit 90. Circuit 88 is coupled to lamp 38, and circuit 90 is coupled to the gate of transistor 21 and voltage tripling circuit 92 by a data line 97. When data line 82 is at a logic HIGH level, FET driver circuit 90 controls the current to transistor 21 such that transistor 21 is conducting, and applies a signal to indicator power circuit 88, which applies power to lamp 38 such that lamp 38 is illuminated.

In the preferred embodiment of circuit 90, circuit 90 is configured such that when data line 82 goes from logic LOW to logic HIGH, circuit 90 controls the current to the gate of transistor 21 such that the current flow through transistor 21 is gradually increased from 0 amps to its maximum. The purpose of this configuration is to prevent extreme current flow spikes through transistor 21 when secondary battery 17 is connected in parallel with a discharged primary battery 16.

Flasher circuit 86 operates to apply a flasher signal to circuit 88 when the logic level on data line 94 is HIGH. The flasher signal causes circuit 88 to interrupt power to lamp 38 such that it flashes. Accordingly, upon expiration of the 2 minute time as clocked by circuit 70, lamp 38 will flash, indicating that the voltage monitored at the primary battery has gone below the first minimum voltage level (9.5V) for more than 2 minutes, and, during the flashing time, remains below the second minimum voltage level (12.8V).

Voltage tripler circuit 92 applies a voltage, via conductor 97, to circuit 90 which is approximately triple that of the voltage at secondary battery 17. By tripling the voltage of secondary battery 17 and applying this voltage to circuit 90, the current flow through transistor 21 can be properly controlled.

To summarize the overall operation of circuit 14, circuit 14 monitors a temperature representative of the temperature of battery 16, the number of key closings within a predetermined time period, and the voltage of battery 16. Transistor 21 is rendered conductive to place battery 17 in parallel with battery 16 if:

1. A key closing occurs and the temperature is below a predetermined limit;
2. A predetermined number of key closings occur within a predetermined time period and the voltage of primary battery is below a first predetermined level; or
3. The voltage of primary battery 16 remains below a second predetermined level after falling below the first predetermined level.

Lamp 38 is illuminated when transistor 21 is conductive, and flashes if the voltage of battery 16 remains below the second level after falling below the first level for more that a predetermined time.

Figure 3A:
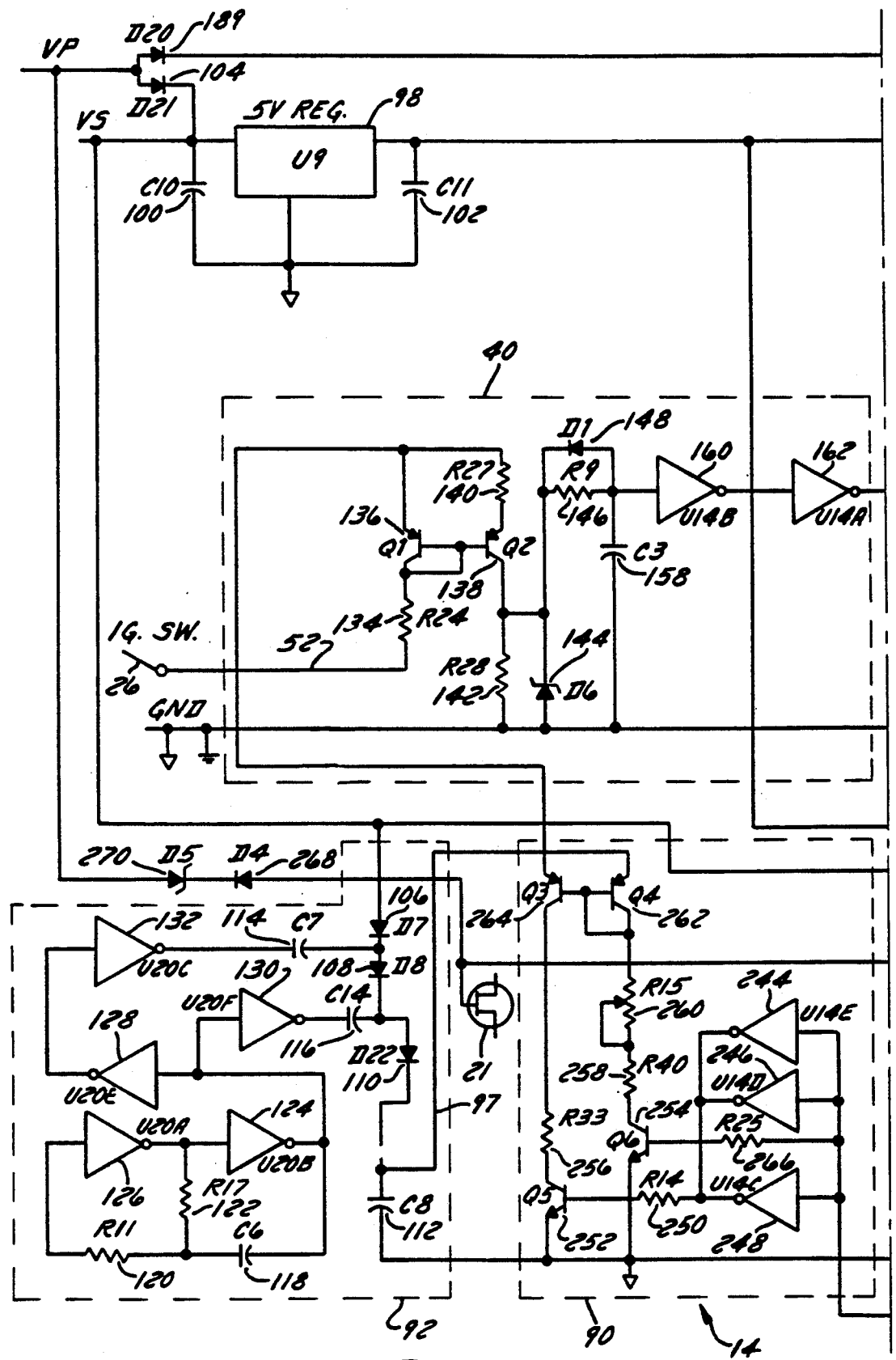
FIGS. 3A, 3B, AND 3C are a continuous schematic diagram of the controller used in the preferred embodiment of the present invention.
Figure 3B:
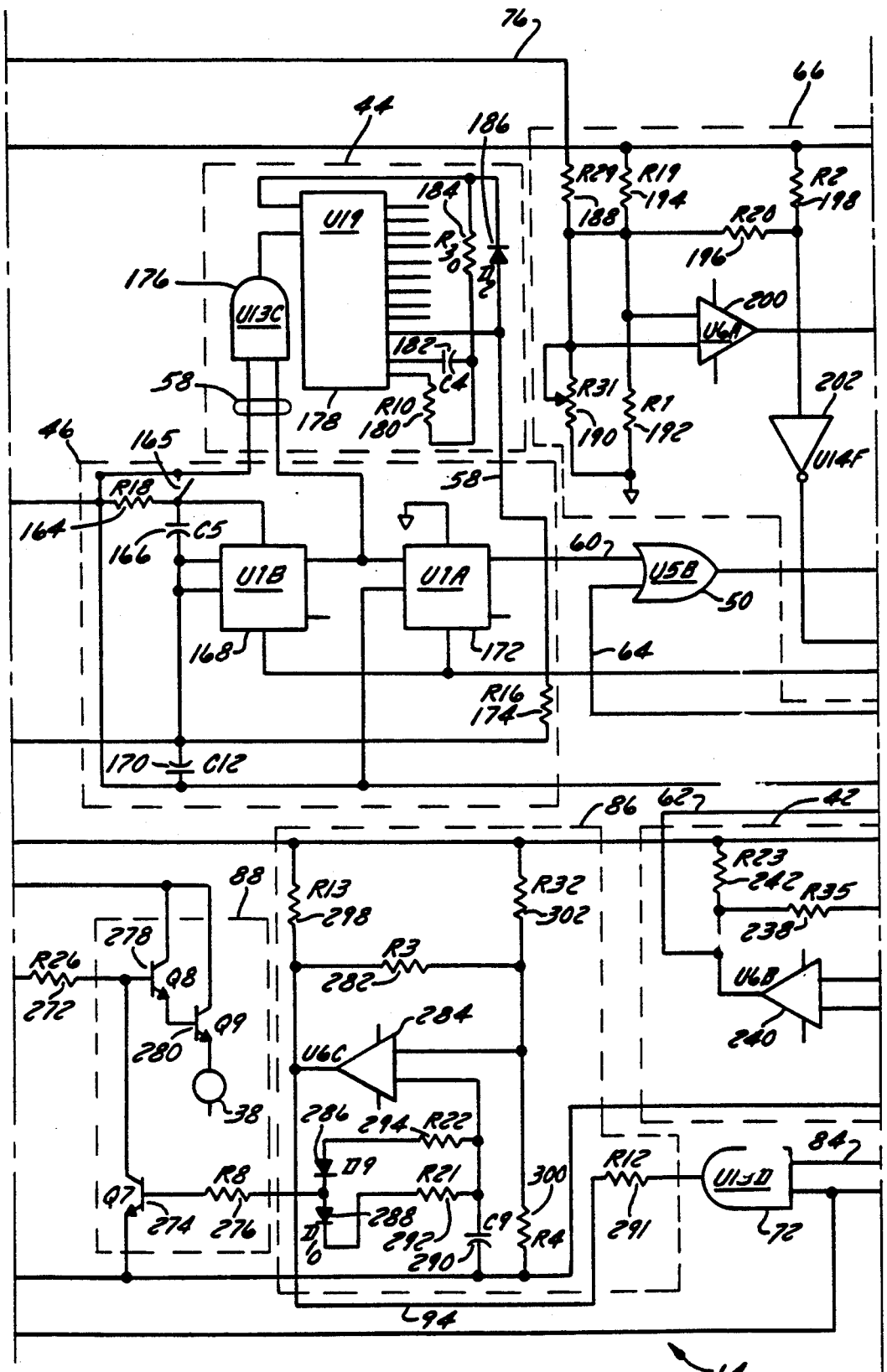
Figure 3C:
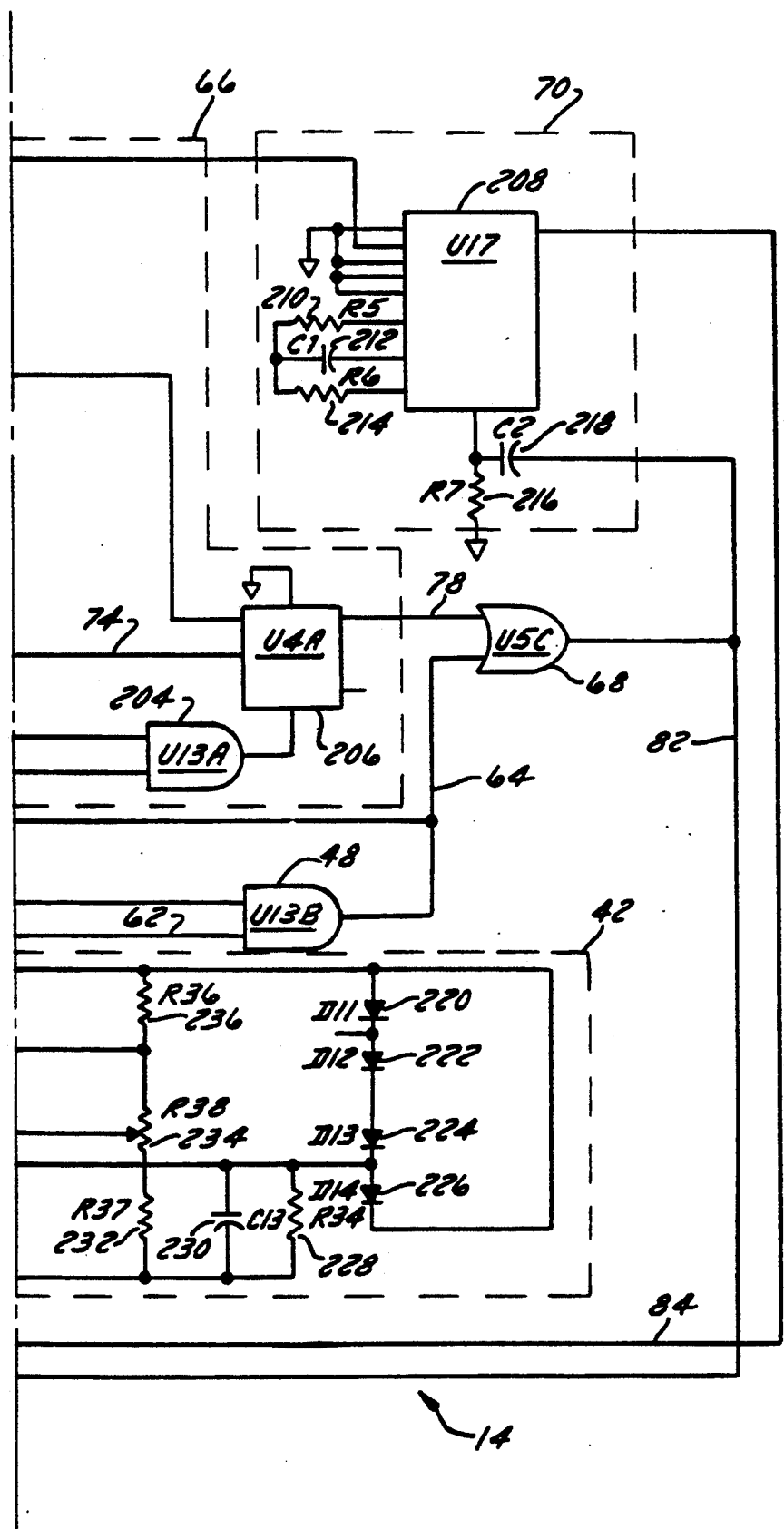

FIG. 3 illustrates the circuit diagram for controller 14. The power for controller 14 is provided by secondary battery 17, having its neutral terminal connected to ground and its positive terminal connected to terminal VS of the circuitry for controller 14. Secondary battery 17 provides power for two voltage sources, a regulated 5V source and a source (voltage tripler circuit 92) having a voltage of approximately three times the voltage of secondary battery 17 (in the range of 37 volts).

The regulated 5V voltage source is provided at the output of a voltage regulator 98, having its input coupled to terminal VS and a capacitor 100. Capacitor 100 is also coupled to ground and provides filtering at the input of regulator 98. The input of voltage regulator 98 is also coupled to the positive terminal of primary battery 16 by a diode 104. This arrangement allows primary battery 16 to assist in powering circuit 14 if the voltage of battery 16 is sufficiently high. The output of regulator 98 is coupled to ground by a capacitor 102 which filters the 5 volt output of regulator 98. The other components of circuit 14 are coupled to the filtered output of regulator 98 as discussed below.

The positive terminal of secondary battery 17 is also connected to the anode of a diode 106, which is part of voltage tripling circuit 92. Circuit 92 is a conventional tripling circuit and includes a diode 108 having its anode coupled to the cathode of diode 106, and a diode 110 having its anode coupled to the cathode of diode 108. The output voltage of circuit 92 is produced at the cathode of diode 110.

Circuit 92 includes a capacitor 114, a capacitor 116, a capacitor 118, a capacitor 112, a resistor 120, a resistor 122, and five inverters 124, 126, 128, 130 and 132. Inverters 126, 124, 128 and 132 are arranged in series, with the output of inverter 132 being coupled to the cathode of diode 106 by capacitor 114. The output of inverter 126 is coupled to its input by resistors 120 and 122, where the output of inverter 124 is coupled to its input by capacitor 118 and resistor 122. The output of inverter 124, in addition to being coupled to the input of inverter 128, is coupled to the input of inverter 130. The output of inverter 130 is coupled to the cathode of diode 108 by capacitor 116.

Debounce circuit 40 includes a resistor 134, a transistor 136, a transistor 138, a resistor 140, a resistor 142, a zener diode 144, a resistor 146, a diode 148, a capacitor 158, an inverter 160, and an inverter 162. Contact arm 26 is coupled to the collector of transistor 136 by resistor 134. The emitter of transistor 136 is coupled to the output of voltage tripler circuit 92, and the emitter of transistor 138 by resistor 140. The bases of transistors 136 and 138 are coupled to the collector of transistor 136. The collector of transistor 138 is coupled to ground by resistor 142 in parallel with zener diode 144, where the anode of zener diode 144 is coupled to ground. The collector of transistor 138 is also coupled to the input of inverter 160 by resistor 146, arranged in parallel with diode 148, where the anode of diode 148 is coupled to the input of inverter 160. The input of inverter 160 is also coupled to ground by capacitor 158, and the output of inverter 160 is coupled to the input of inverter 162. This arrangement of debounce circuit 40 provides a pulse to circuit 46 and AND gate 48 in response to a key closing at contact arm 26.

Key closing and counting circuit 46 includes a resistor 164, a capacitor 166, a flip flop 168, a capacitor 170, a flip flop 172, and a resistor 174. The output of inverter 162 is coupled to the D and CLOCK inputs of flip flop 168 by the series arrangement of resistor 164 and capacitor 166. The junction between resistor 164 and capacitor 166 is coupled to the S input of flip flop 168. The D and CLOCK inputs of flip flop 168 are also coupled to ground, and coupled to one input of AND gate 48 by capacitor 170. The Q output of flip flop 168 is connected to the D input of flip flop 172, where the CLOCK input of flip flop 172 is coupled to one input of AND gate 48. The SET input of flip flop 172 is grounded, and the Q output is coupled to one input of OR gate 50. This arrangement of circuit 46 allows flip flop 168 to be set just prior to the application of a signal to the D and CLOCK inputs, producing a logic HIGH at the Q output in response to a pulse produced by inverter 162. The CLOCK of flip flop 172 is also coupled to the output of inverter 162. Upon the application of a second pulse by inverter 162 to circuit 46, the signal at the Q output of flip flop 168 is clocked into flip flop 172 to produce the same output at the Q output of flip flop 172. Thus, after two pulses by inverter 162, the logic level at the Q output of flip flop 172 is HIGH, rendering the output of OR gate 50 HIGH.

Circuit 46 includes a jumper 165 which, when closed, causes circuit 46 to apply a logic HIGH signal to OR gate 50 every time inverter 162 produces a pulse, and when open, causes circuit 46 to apply a logic HIGH signal to OR gate 50 every time inverter 162 produces two pulses. Of course, additional flip flops may be included in circuit 46 such that more than two key closings are required to apply a logic HIGH signal to OR gate 50.

Timed reset circuit 44 includes an AND gate 176, a timer 178, a resistor 180, a capacitor 182, a resistor 184, and a diode 186. The inputs to AND gate 176 are coupled to the output of inverter 162 and the Q output of flip flop 168, where the output of AND gate 176 is coupled to the RESET input of timer 178. Pins 9 and 10 of timer 178 are coupled together by the series connection of resistor 180 and capacitor 182. The combination of resistor 180 and capacitor 182 provides a clock for timer 178. The junction between resistor 180 and capacitor 182 is coupled to the PI input of timer 178 by resistor 184. Diode 186 couples the Q14 terminal of timer 178 to the PI terminal. The Q14 terminal of timer 178 is coupled to the RESET inputs of flip flops 168 and 172. Each time a pulse is produced by inverter 162, AND gate 176 resets timer 178, where timer 178 will produce a RESET signal at terminal Q14 which resets flip flops 168 and 172 and initializes timer 178. The time period for timer 178 is adjusted by selecting resistor 180 and capacitor 182, where various fixed time outputs may be selected at terminals Q4–Q14 of timer 178. Accordingly, if two key closings occur within the selected (predetermined) time period, flip flop 172 will apply a logic HIGH signal to or gate 50.

Battery monitoring circuit 66 includes a resistor 188, a potentiometer 190, a resistor 192, a resistor 194, a resistor 196, a resistor 198, a comparator 200, an inverter 202, an AND gate 204, and a flip flop 206. The inverting input of comparator 200 is coupled to ground by potentiometer 190, and coupled to the positive terminal of primary battery 16 by resistor 188 and a diode 189. The non-inverting input of comparator 200 is coupled to ground by resistor 192, coupled to the output by resistor 196, and coupled to output of regulator 98 by resistor 194. The output of comparator 200 is also coupled to the output of regulator 98 by resistor 198, coupled to the input of inverter 202, and coupled to the D input of flip flop 206.

The output of inverter 202 is coupled to one input of AND gate 204, where the other input of AND gate 204 is coupled to terminal Q14 of timer 178. The CLOCK input of flip flop 206 is coupled to the output of OR gate 50, and the Q output of flip flop 206 is coupled to one input of OR gate 68. Accordingly, when the logic level on data line 74 is HIGH and the voltage at primary battery 16 is below a threshold voltage, which is adjustable at potentiometer 190, comparator 200 will output a logic HIGH signal to flip flop 206, where the signal will be clocked into flip flop 206 to produce a HIGH logic output at data line 78.

Flip flop 206 is reset when timer 178 times out and applies a logic HIGH signal to AND gate 204, and the voltage at primary battery 16 is higher than 12.8V such that inverter 202 applies a logic HIGH signal to AND gate 204. When both inputs of AND gate 204 are logic HIGH, gate 204 applies a RESET signal to flip flop 206, thus driving the Q output of flip flop 206 to ground since the SET input of flip flop 206 is grounded.

Timer circuit 70 includes a timer 208, a resistor 210, a capacitor 212, a resistor 214, a resistor 216 and a capacitor 218. The A, AR, MO and Q pins of timer 208 are grounded, and the B pin of timer 208 is coupled to the output of regulator 98. Clocking for timer 208 is provided by the combination of resistor 210, capacitor 212 and resistor 214, which are coupled to pins RTC, CTC, and RS, respectively, where resistor 210, capacitor 212 and resistor 214 are connected together. The output of OR gate 68 is coupled to the RESET pin of timer 208 by capacitor 218, where the RESET pin is also coupled to ground by resistor 216. Capacitor 218 and resistor 216 provide filtering for the RESET pin of timer 208. Accordingly, each time OR gate 68 goes HIGH, timer 208 is reset such that the Q output of timer 208 goes to logic level HIGH after a predetermined amount of time expires, e.g. 2 minutes.

Temperature sensing circuit 42 includes four diodes 220, 222, 224 and 226, a resistor 228, a capacitor 230, a resistor 232, a potentiometer 234, a resistor 236, a resistor 238, a comparator 240, and a resistor 242. The anode of diode 220 is coupled to the output of regulator 98, the anode of diode 222 is coupled to the cathode of diode 220, the anode of diode 224 is coupled to the cathode of diode 222, and the cathode of diode 224 is coupled to ground by the parallel arrangement of resistor 228 and capacitor 230. The cathode of diode 224 is also coupled to the anode of diode 226, having its cathode coupled to the output of regulator 98. The inverting input of comparator 240 is coupled to the junction between diodes 224 and 226, where the voltage at the junction between diodes 224 and 226 is representative of the temperature of the circuit board for controller 14 in the vicinity of diodes 220, 222, 224 and 226.

The non-inverting input of comparator 240 is coupled to the wiper of potentiometer 234, where the resistive winding of potentiometer 234 is coupled to ground by resistor 232 and coupled to the output of regulator 98 by resistor 236. The winding of potentiometer 234 is coupled to the output of comparator 240 by resistor 238. The output of comparator 240 is coupled to the output of regulator 98 by resistor 242. Potentiometer 234 allows for the adjustment of the voltage applied to the non-inverting input of comparator 240 such that the temperature at which comparator 240 outputs a logic HIGH signal may be adjusted. Thus, when the temperature at the diodes goes below a predetermined temperature, such as 5°F., comparator 240 will apply a logic HIGH signal to AND gate 48 such that AND gate 48 applies a logic HIGH signal to OR gates 50 and 68 when inverter 162 applies a logic HIGH signal to key closing counting circuit 46.

Referring again to OR gate 68, OR gate 68 will output a logic HIGH signal to data line 82 when the temperature at diodes 220, 222, 224 and 226 is below a predetermined temperature and a key closing occurs, or when a predetermined number of key closings have occurred within a predetermined amount of time and the voltage at primary battery 16 is below a predetermined voltage.

The output of OR gate 68 is connected to FET driver circuit 90 at the inputs of three inverters 244, 246 and 248 by data line 82. The three inverters are used to provide an output voltage having an appropriate level of current to drive the remainder of circuit 90. The remainder of circuit 90 includes a resistor 250, a transistor 252, a transistor 254, a resistor 256, a resistor 258, a potentiometer 260, a transistor 262, a transistor 264, and a resistor 266. The outputs of inverters 244, 246 and 248 are coupled to the base of transistor 252 by resistor 250, where the emitter of transistor 252 is coupled to ground.

The emitters of transistors 262 and 264 are coupled to the junction between diode 110 and capacitor 112 of voltage tripling circuit 92, where the collector of transistor 264 is coupled to the gate of FET 21, and the positive terminal of primary battery 16 by a diode 268 and a zener diode 270. Resistor 256 couples the collector of transistor 252 to the collector of transistor 264, and the series arrangement of resistor 258 and potentiometer 260 couple the collector of transistor 254 to the collector of transistor 262. The collector of transistor 262 is connected to its base.

FET driver circuit 90 is set up as a current mirror such that the current through FET 21 may be controlled in such a way that the current flow through FET 21 may be gradually increased to the maximum current which flows through FET 21. More specifically, potentiometer 260 is adjustable to control the time in which the current flow through FET 21 increases from 0 amps to the maximum amperage. This arrangement prevents sudden surges of current flow through FET 21 in situations where the primary battery 16 is substantially discharged and a large current flow is required for the voltage of battery 16 to come up to the voltage of secondary battery 17.

The collector of transistor 264 is also connected to indicator power circuit 88 by a resistor 272. Circuit 88 includes a transistor 274, a resistor 276, a transistor 278, and a transistor 280. Resistor 272 is connected to the base of transistor 27 and the collector of transistor 274, where the emitter of transistor 274 is connected to ground. The collector of transistor 278 is connected to the collector of transistor 280 and the positive terminal of secondary battery 17. The emitter of transistor 278 is connected to the base of transistor 280, where the emitter of transistor 280 is connected to lamp 38. Accordingly, when the logic level on line 82 is HIGH and circuit 90 is applying current to the gate of FET 21, circuit 88 applies power to lamp 38 such that lamp 38 is illuminated.

Resistor 276 is coupled between the base of transistor 274 and flasher circuit 86. Circuit 86 includes a resistor 282, a comparator 284, a diode 286, a diode 288, a capacitor 290, a resistor 292, a resistor 294, a resistor 296, and a resistor 298. Resistor 298 couples the output of comparator 284 to the output of regulator 98. The output of comparator 284 is also coupled to the output of AND gate 72 by resistor 296, where the cathode of diode 286 is also coupled to the output of comparator 284. The inverting input of comparator 284 is coupled to the anode of diode 286 by resistor 294, and coupled to the cathode of diode 288 by resistor 292, where the anode of diode 288 is connected to the cathode of diode 286. Capacitor 290 couples the inverting input of comparator 284 to ground. The non-inverting input of comparator 284 is coupled to ground by a resistor 300, coupled to the output of comparator 284 by resistor 282, and coupled to the output of regulator 98 by a resistor 302. Circuit 86 operates to oscillate when the logic level at the output of AND gate 72 is HIGH, such that the voltage at the base of transistor 274 of circuit 88 is varied in a way such that circuit 88 causes lamp 38 to flash. Accordingly, when the logic levels at the inputs of AND gate 72 are HIGH (i.e., FET 21 is conducting for more than 2 minutes), indicator lamp 38 flashes.

Where not shown, the components of controller 14 which require power are supplied power from the output of regulator 98 in a conventional manner. The components of controller 14 are listed below in Table A.

TABLE A

| | |
|---|---|
| 98 | LM7805C Voltage Regulator |
| 100 | .22 µf Capacitor |
| 102 | 1 µf Capacitor |
| 104 | MBAW56L Diode |
| 106 | BAV99L Diode |
| 108 | BAV99L Diode |
| 110 | BAV99L Diode |
| 112 | 1 µf Capacitor |
| 114 | .1 µf Capacitor |
| 116 | .1 µf Capacitor |
| 118 | 100 pf Capacitor |
| 120 | 3M Resistor |
| 122 | 300K Resistor |
| 124 | 4049 Inverter |
| 126 | 4049 Inverter |
| 128 | 4049 Inverter |
| 130 | 4049 Inverter |
| 132 | 4049 Inverter |
| 134 | 1K Resistor |
| 136 | 2N3906 Transistor |
| 138 | 2N3906 Transistor |
| 140 | 100 Ohm Resistor |
| 142 | 100K Resistor |
| 144 | 1N5231B Zener Diode |
| 146 | 1M Resistor |
| 148 | BAV99L Diode |
| 158 | .1 µf Capacitor |
| 160 | 4049 Inverter |
| 162 | 4049 Inverter |
| 164 | 100K Resistor |
| 166 | .1 µf Capacitor |
| 168 | 4013 Flip Flop |
| 170 | 100 pf Capacitor |
| 172 | 4013 Flip Flop |
| 174 | 100K Resistor |
| 176 | 4081 AND gate |
| 178 | 4060 Timer |
| 180 | 200K Resistor |
| 182 | .1 µf Capacitor |
| 184 | 2.2M Resistor |
| 186 | BAV99L Diode |
| 188 | 100K Resistor |
| 189 | MBAW56L Diode |
| 190 | 26.2K Potentiometer |
| 192 | 100K Resistor |
| 194 | 100K Resistor |
| 196 | 179K Resistor |
| 198 | 330K Resistor |
| 200 | TLC374C Comparator |
| 202 | 4049 Inverter |
| 204 | 4081 AND Gate |
| 206 | 4013 Flip Flop |
| 208 | 4541 Timer |
| 210 | 1M Resistor |
| 212 | .1 µf Capacitor |
| 214 | 1M Resistor |
| 216 | 50K Resistor |
| 218 | .01 µf Capacitor |
| 220 | BAV99L Diode |
| 222 | BAV99L Diode |
| 224 | BAV99L Diode |
| 226 | BAV99L Diode |
| 228 | 200K Resistor |
| 230 | .1 µf Capacitor |
| 232 | 180K Resistor |
| 234 | 50K Potentiometer |
| 236 | 50K Resistor |
| 238 | 1M Resistor |
| 240 | TLC374C Comparator |
| 242 | 100K Resistor |
| 244 | 4049 Inverter |
| 246 | 4049 Inverter |
| 248 | 4049 Inverter |
| 250 | 100K Resistor |
| 252 | 2N3904 Transistor |

TABLE A-continued

| | |
|---|---|
| 254 | 2N3904 Transistor |
| 256 | 9K Resistor |
| 258 | 1K Resistor |
| 260 | 10K Potentiometer |
| 262 | 2N3906 Transistor |
| 264 | 2N3906 Transistor |
| 266 | 50K Resistor |
| 268 | BAV99L Diode |
| 270 | 1N5247B Zener Diode |
| 272 | 100K Resistor |
| 274 | 2N3904 Transistor |
| 276 | 100K Resistor |
| 278 | 2N3904 Transistor |
| 280 | 2N3904 Transistor |
| 282 | 100K Resistor |
| 284 | TLC374C Comparator |
| 286 | BAV99L Diode |
| 288 | BAV99L Diode |
| 290 | 6.8 µf Capacitor |
| 292 | 100K Resistor |
| 294 | 1K Resistor |
| 296 | 5K Resistor |
| 298 | 50K Resistor |
| 300 | 100K Resistor |
| 302 | 100K Resistor |

While one embodiment of the present invention has been shown and described in detail, various components and circuit arrangement modifications may be made without departing from the scope of the invention as expressed in the appended claims. For example, all or a portion of the circuits may be replaced with an appropriately programmed microprocessor or a single integrated circuit.

Additionally, battery monitoring circuit 66 can be omitted so that double-keying of the ignition switch draws power from the secondary battery regardless of the state of charge of the primary battery. These and other modifications may be made in the design and arrangement of the elements without departing from the scope of the invention as expressed in the appended claims.

What is claimed is:

1. An electrical power control system for a motor vehicle of the type wherein electrical power is used for motor ignition, and which system comprises a primary battery and a secondary battery, comprising:
    a starter which connects the primary battery to a starter motor to start the vehicle when the starter is energized;
    a starter switch operatively connected with the starter, the starter switch being configured to cause the starter to connect the primary battery to the starter motor when the starter switch is actuated;
    an electrically-actuable switch, operatively connected with the starter and the secondary battery so that, when the electrically-actuable switch is closed, the starter connects the secondary battery to the starter motor to draw additional power for starting the vehicle; and
    a controller connected to the electrically-actuable switch and the starter switch, which controller senses closure of the starter switch and closes the electrically-actuable switch if the starter switch has been previously actuated one or more times within a predetermined time period.

2. The system of claim 1, wherein the starter switch is configured to be manually actuated by a key, the primary battery being connected to the starter through the starter switch so that closure of the starter switch by manual actuation of a key energizes the starter.

3. The system of claim 1, wherein the electrically actuable switch connects a termination of the secondary battery and a termination of like charge of the primary battery.

4. The system of claim 1, wherein the starter switch comprises a plurality of switches that open and close in tandem, the plurality of switches comprising a first switch and a second switch, the first switch connecting the controller to ground when closed, and the second switch connecting the primary battery to the starter when closed.

5. The system of claim 1, wherein the controller is operatively connected with and configured to draw power from the secondary battery.

6. The system of claim 5, wherein the starter switch comprises a plurality of switches, the plurality of switches comprising a first switch and a second switch, wherein closure of the starter switch causes the closure of each switch of the plurality of switches, wherein the first switch grounds a contact of the controller when closed, wherein the second switch connects the primary battery to the starter when closed, wherein the controller determines that starter switch is closed by sensing when the contact is grounded.

7. The system of claim 1, wherein the controller comprises electronic circuitry that monitors the state of charge of the primary battery and closes the electrically-actuable switch only if (A) the starter switch has been previously actuated one or more times within a predetermined time period, and (B) the primary battery has been discharged below a predetermined level.

8. The system of claim 1, wherein the controller comprises a temperature sensing circuit that closes the electrically-actuable switch on each actuation of the starter switch when the temperature sensed by the temperature sensing circuit is below a predetermined level.

9. The system of claim 7, wherein the controller comprises a temperature sensing circuit that closes the electrically-actuable switch on each actuation of the starter switch when the temperature sensed by the temperature sensing circuit is below a predetermined level.

10. An electrical power control system for a motor vehicle of the type wherein electrical power is used for motor ignition, and which system comprises a primary battery and a secondary battery, comprising:
a starter which connects the primary battery to a starter motor to start the vehicle;
a starter switch, operatively connected to the starter, which causes the starter to connect the primary battery to the starter motor when the starter switch is closed;
an electrically-actuable switch operatively connected with the secondary battery and the starter so that, when the electrically-actuable switch is closed, the starter can connect the secondary battery to the starter motor to draw additional power for starting the vehicle; and
a controller connected to the electrically-actuable switch and the starter switch, which controller comprises a temperature sensing circuit that causes the electrically-actuable switch to be closed during starting if the temperature sensed by the temperature sensing circuit is below a predetermined level.

* * * * *